(No Model.)

D. D. WHITNEY.
THILL COUPLING.

No. 349,964. Patented Sept. 28, 1886.

Witnesses:
B. T. Vetterlein
Joseph L. Levy

Inventor:
Daniel D. Whitney
By Phillips Abbott
his Attorney.

United States Patent Office.

DANIEL D. WHITNEY, OF CORNWALL, NEW YORK, ASSIGNOR TO ARTHUR F. WHITIN, OF WHITINSVILLE, MASSACHUSETTS, AND WILLIAM H. VAIL, OF CORNWALL ON THE HUDSON, NEW YORK.

THILL-COUPLING.

SPECIFICATION forming part of Letters Patent No. 349,964, dated September 28, 1886.

Application filed April 27, 1886. Serial No. 200,308. (No model.)

*To all whom it may concern:*

Be it known that I, DANIEL D. WHITNEY, a citizen of the United States, and a resident of Cornwall, in the county of Orange and State of New York, have invented certain new and useful Improvements in Thill-Couplings, of which the following is a specification.

My invention relates to devices employed for securing thills or poles to the axle of carriages, wagons, buggies, &c., and has for its object the provision of a thill-coupling cheap and simple to construct, noiseless in use, durable and effective, and wherein the parts are securely held against displacement, the present invention being an improvement upon the device shown and described in Letters Patent No. 200,591, granted to me February 19, 1878, for an improvement in thill-couplings.

My invention consists, essentially, in a thill-iron provided with a cross-bolt which is surrounded by a tubular rubber sleeve, the cross-bolt, with its rubber covering, being held in a recess in the axle-clip by a bolt having a flange-like clamping-jaw extending over the cross-bolt. This bolt and its clamping-jaw are adjustably held in place by a nut impinging upon a spring-washer, said nut having a shoulder, beneath which shoulder the clip-bar at the under side of the axle extends, thus holding the adjusting-nut against displacement, all of which will be hereinafter first fully described, and then pointed out in the claims.

Figure 1:
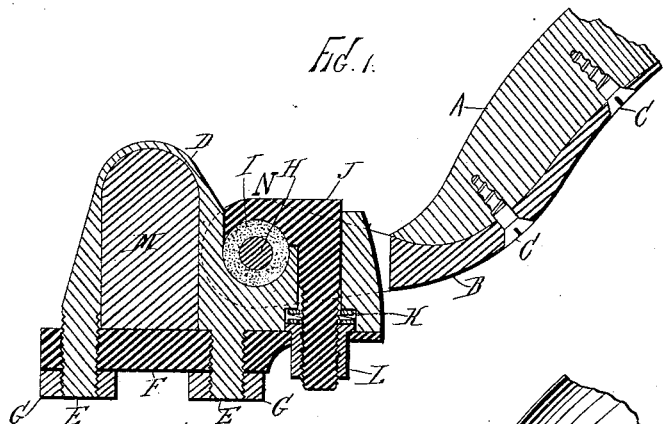
Figure 2:
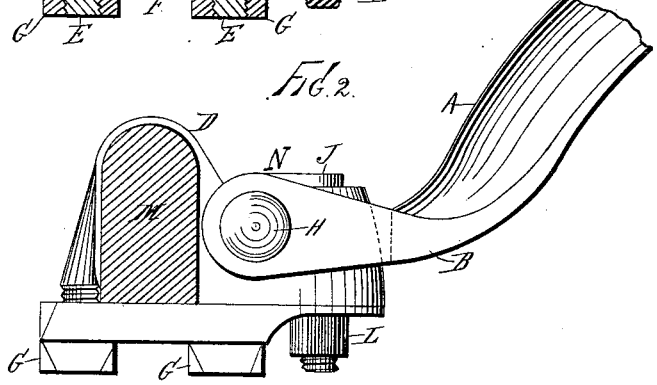
Figure 3:
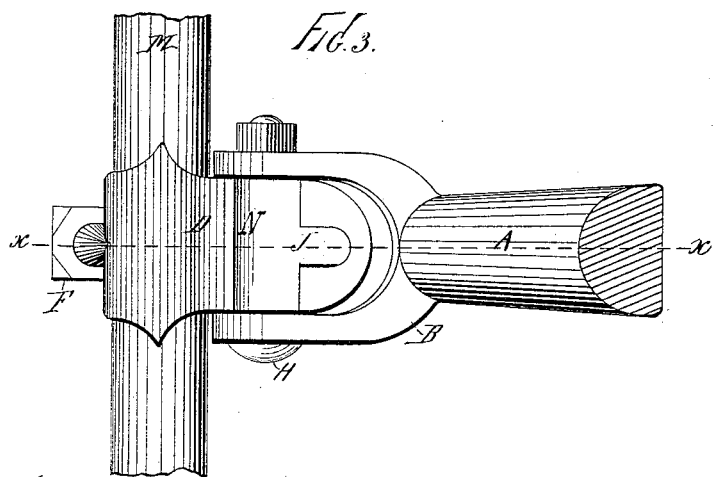

In the drawings, Figure 1 is a longitudinal sectional view at line X X of Fig. 3. Fig. 2 is a side elevation. Fig. 3 is a plan view of the device.

Like letters of reference, wherever they occur, indicate corresponding parts in all the figures.

A is the thill, to which the thill-iron B is secured by screws C, or by bolts or any other suitable device.

D is the axle-clip, having bolts E E extending through the clip-bar F, and bearing nuts G.

H is a bolt passing through the bifurcated ends of the thill-iron, and also through the axle-clip when in position. Said bolt is surrounded by a tubular rubber sleeve, I.

J is the clamping-bolt, passing downward through a vertical hole in the axle-clip. It is provided with a horizontally extending flange or clamping-jaw, N, which extends rearwardly over the bolt H and the rubber sleeve I surrounding it. The lower extremity of the clamping-bolt is provided with a spring-washer, K, against which the adjusting-nut L bears. This spring-washer serves a double purpose: First, it takes up all wear between the clip-bar F and the adjusting-nut L, and, secondly, it acts as a lock to the nut L, preventing it from turning when subjected to jar. The forward end of the clip-bar F has a hole in it, as shown, in which the nut L can be turned, but which is not large enough to allow the shoulder on the upper end of the nut to pass through it.

The operation is as follows: To separate the thills from the axle, unscrew the nuts L. This forces the bolts J and their clamping-jaws upwardly. When sufficiently elevated, the jaws should be turned half around to project forwardly instead of rearwardly, and the thills can then be lifted up and away from the clip D. To recouple the thills to the axle, the operation is reversed. As the parts become worn by use, the wear may be quickly and effectively taken up by simply tightening the nut L.

There are several important advantages secured by my present invention over my said former invention, among them that in this the flange or clamping-jaw works vertically instead of horizontally, and thus the length of the coupling forward from the axle is very materially lessened, which reduces liability of fracture, and also greatly enhances the appearance of the coupling. Also, the clamping-jaw in this closes down over the joint between the rubber and the clip and acts as a cover to the same. This prevents the entrance of dust, sand, &c., which wear the rubber and even the metal parts very rapidly. Also, in this the coupling can be readily opened, and the thills taken away readily and easily. In the former case it was necessary to lift the thills high up and to hold them up in order to get at the nut which operated the clamping-jaws. Also, in this the spring-washer acts as a take-up of wear in the adjacent parts, and also as a lock for the clamping-nut. In the other the pin there used did not act in either of these capacities.

It will be apparent to those skilled in this art that changes may be made in the details of construction shown and still my invention be practically embodied. I do not therefore limit myself to the details of construction shown.

Having described my invention, I claim—

1. In a thill-coupling, the combination, with the cross-bolt of the thill-iron, of a clamping-bolt passing through the axle-clip, a recess in said clip containing a spring-washer, against which a shouldered nut presses, said nut being held against displacement by the clip-bar passing beneath the axle, substantially as shown and described.

2. The combination, in a thill-coupling, of a clip-bar passing beneath the axle, provided with an apertured end extending forwardly and engaging with and supporting the nut of a clamping-bolt, so that the clip-bar will hold the nut in place upon unscrewing the same and cause the projection of the clamping-bolt, substantially as and for the purposes set forth.

3. A thill-coupling consisting of coupling-iron B, bolt H, provided with a rubber cushion, I, clamping-bolt J, spring-washer R, shouldered nut L, clip D, and clip-bar F, the whole combined and arranged substantially as shown and described.

Signed at New York, in the county of New York and State of New York, this 26th day of April, A. D. 1886.

DANIEL D. WHITNEY.

Witnesses:
WALTER H. CRITTENDEN,
JOHN H. IVES.